US 8,656,802 B2

United States Patent
Behounek et al.

(10) Patent No.: US 8,656,802 B2
(45) Date of Patent: Feb. 25, 2014

(54) SHIFTER ASSEMBLY FOR PROVIDING MECHANICAL AND ELECTRONIC ACTUATION TO A TRANSMISSION OF A VEHICLE AND A METHOD OF OPERATING THE SHIFTER ASSEMBLY

(75) Inventors: Jeff Behounek, Macomb, MI (US); Kenneth Skogward, Huskvarna (SE)

(73) Assignee: Kongsberg Automotive AB, Mullsjo (SE)

( * ) Notice: Subject to any disclaimer, the term of this patent is extended or adjusted under 35 U.S.C. 154(b) by 187 days.

(21) Appl. No.: 13/249,724

(22) Filed: Sep. 30, 2011

(65) Prior Publication Data
US 2013/0081501 A1    Apr. 4, 2013

(51) Int. Cl.
*B60K 20/00*    (2006.01)
*F16C 1/00*    (2006.01)
*G05G 9/00*    (2006.01)

(52) U.S. Cl.
USPC ..................................... 74/473.15; 74/473.18

(58) Field of Classification Search
USPC .................. 74/337.5, 473.1, 473.12, 473.15, 74/473.18–473.3, 473.32–473.34, 471 R; 180/336
See application file for complete search history.

(56) References Cited

U.S. PATENT DOCUMENTS

| | | | |
|---|---|---|---|
| 4,850,238 A | 7/1989 | Inoue | |
| 4,977,789 A | 12/1990 | Osborn | |
| 5,357,820 A | 10/1994 | Moroto et al. | |
| 5,398,565 A * | 3/1995 | Brock | 74/473.33 |
| 5,791,197 A | 8/1998 | Rempinski et al. | |
| 5,845,535 A * | 12/1998 | Wakabayashi et al. | 74/473.18 |
| 5,870,929 A * | 2/1999 | Bravo | 74/473.18 |
| 5,899,115 A | 5/1999 | Kataumi et al. | |
| 5,913,909 A | 6/1999 | Schwab | |
| 6,192,770 B1 | 2/2001 | Miyoshi et al. | |
| 6,196,080 B1 * | 3/2001 | Lee | 74/473.18 |
| 6,209,410 B1 | 4/2001 | Suzuki | |

(Continued)

FOREIGN PATENT DOCUMENTS

| | | |
|---|---|---|
| JP | 2005-206017 A | 8/2005 |
| KR | 100783516 B1 | 12/2007 |
| WO | WO 00/03162 A1 | 1/2000 |

OTHER PUBLICATIONS

European Search Report for Application No. EP 12 18 6760 dated Jan. 11, 2013, 3 pages.

(Continued)

*Primary Examiner* — David M Fenstermacher
*Assistant Examiner* — Jake Cook
(74) *Attorney, Agent, or Firm* — Howard & Howard Attorneys PLLC

(57) ABSTRACT

A shifter assembly for providing mechanical and electronic actuation to a transmission and a method of operating the same is disclosed. A shift lever is pivotable about a first axis in a first mode for providing mechanical actuation, and a second mode for providing electronic actuation to the transmission. An arm is pivotable about the first axis concurrently with the shift lever in at least the first mode. The arm includes a first and second engagement surface. The shifter assembly includes a cam pivotable about a second axis between a first and second position. The first engagement surface urges the cam to move between the first and second positions as the shift lever pivots in the first mode. The second engagement surface abuts the cam as the shift lever pivots in the second mode such that the arm pivots about the first axis while the cam remains stationary.

28 Claims, 6 Drawing Sheets

(56) References Cited

U.S. PATENT DOCUMENTS

| | | |
|---|---|---|
| 6,230,579 B1 * | 5/2001 | Reasoner et al. .......... 74/473.18 |
| 6,295,886 B1 | 10/2001 | Russell |
| 6,382,046 B1 * | 5/2002 | Wang .......................... 74/473.15 |
| 6,408,709 B2 | 6/2002 | Kim |
| 6,530,293 B1 | 3/2003 | Ruckert et al. |
| 6,662,924 B2 | 12/2003 | Giefer et al. |
| 6,732,847 B1 | 5/2004 | Wang |
| 6,918,314 B2 * | 7/2005 | Wang .............................. 74/335 |
| 7,322,457 B2 | 1/2008 | Giefer et al. |
| 7,334,497 B2 | 2/2008 | Giefer et al. |
| 2001/0004851 A1 * | 6/2001 | Kim .......................... 74/473.15 |
| 2004/0025615 A1 * | 2/2004 | Nagasawa .................... 74/473.1 |
| 2008/0041180 A1 | 2/2008 | Cho |
| 2012/0067155 A1 * | 3/2012 | Grosse Kohorst ......... 74/473.15 |

OTHER PUBLICATIONS

English language abstract for KR 100783516 extracted from the espacenet.com database on Mar. 5, 2013, 1 page.

English language abstract for JP 2005-206017 extracted from the PAJ database on Mar. 5, 2013, 1 page.

Machine-assisted English translation for JP 2005-206017 extracted from the PAJ database on Mar. 5, 2013, 22 pages.

* cited by examiner

SHIFTER ASSEMBLY FOR PROVIDING MECHANICAL AND ELECTRONIC ACTUATION TO A TRANSMISSION OF A VEHICLE AND A METHOD OF OPERATING THE SHIFTER ASSEMBLY

BACKGROUND OF THE INVENTION

1. Field of the Invention

The subject invention generally relates to a shifter assembly for providing mechanical actuation to a transmission of a vehicle by movement of a control cable and for providing electronic actuation to the transmission of the vehicle and a method of operating the shifter assembly.

2. Description of Related Art

In practically every vehicle today, a shifter is utilized to control the transmission of a vehicle. Some shifters mechanically actuate the transmission by movement of a mechanical linkage. For shifters which mechanically actuate the transmission, a driver generally moves a lever which in turn pushes or pulls the mechanical linkage thereby transmitting load to actuate the transmission.

Alternatively, other shifters electronically actuate the transmission. For shifters which electronically actuate the transmission, movement of the lever is electronically sensed. That is, a relative position of the lever is sensed by the shifter and an electronic signal is generated corresponding to the relative position of the lever. A control unit receives and processes the electronic signal and commands the transmission to actuate into a gear position corresponding to the relative position of the lever sensed by the shifter. However, having electronic shifting as the sole means of shifting the transmission is expensive because of the need for relatively expensive electronic components required to achieve performance comparable to shifters which are entirely dependent on mechanical shifting. In addition, the shifter is entirely dependent on electronic shifting and therefore cannot change gears of the transmission during a power failure of the vehicle.

Yet other shifters are capable of providing mechanical actuation as well as electronic actuation to the transmission. That is, such shifters mechanically actuate the transmission in specific gears, and electronically actuate the transmission in the remaining gears. These shifters generally have mechanical components to mechanically actuate the transmission. However, these shifters neither provide a robust structure nor method to prevent the mechanical components from unexpectedly moving out of position without the intent of the driver of the vehicle when the shifter is electronically actuating. As a result, there is an increased possibility that the transmission will be damaged. Further, U.S. Pat. No. 6,382,046 to Wang discloses a shifter capable of providing mechanical actuation as well as electronic actuation to the transmission. The shifter includes a cable block lever and a cable attachment bracket which pivot to mechanically actuate the transmission. However, the cable block lever may only indirectly urge the cable attachment bracket to pivot. That is, the cable block lever is fixed to the cable attachment bracket and must press against a wall of the shifter in order to create leverage to force the cable attachment bracket to pivot.

Therefore, there remains an opportunity to develop a shifter that provides both mechanical and electronic actuation to a transmission by utilizing a cable block lever and a cable attachment bracket being separated from each other such that the cable block lever itself urges the cable attachment bracket to pivot in order to provide mechanical actuation. In addition, there remains an opportunity to develop a shifter with the cable block lever itself preventing the cable attachment bracket from unexpectedly moving out of position without the intent of the driver of the vehicle when the shifter is electronically actuating the transmission.

SUMMARY OF THE INVENTION

The subject invention provides a shifter assembly for providing mechanical actuation to a transmission of a vehicle by movement of a control cable and for providing electronic actuation to the transmission of the vehicle. The shifter assembly includes a housing and a shift lever coupled to the housing. The shift lever is pivotable about a first axis in a first mode for providing mechanical actuation to the transmission, and a second mode for providing electronic actuation to the transmission. The shifter assembly further includes an arm coupled to the housing and pivotable about the first axis concurrently with the shift lever in at least the first mode. The arm includes a first engagement surface and a second engagement surface. The shifter assembly also includes a cam coupled to the housing and pivotable about a second axis spaced from the first axis between a first position and a second position for moving the control cable to mechanically actuate the transmission. The first engagement surface of the arm urges the cam to move between the first and second positions as the shift lever pivots in the first mode such that the arm pivots about the first axis concurrently with the cam pivoting about the second axis for moving the control cable and providing mechanical actuation to the transmission. The second engagement surface of the arm abuts the cam as the shift lever pivots in the second mode such that the arm pivots about the first axis while the cam remains stationary.

Additionally, a method of operating the shifter assembly is provided. The method includes the steps of concurrently pivoting the shift lever and the arm about the first axis in a first mode to provide mechanical actuation to a transmission, and engaging the first engagement surface of the arm with the cam to simultaneously rotate the cam about the second axis concurrently with the arm pivoting in the first mode. The method further includes the step of pivoting the shift lever about the first axis in a second mode to provide electronic actuation to the transmission. In addition, the method further includes the step of abutting the second engagement surface of the arm against the cam to prevent movement of the cam during pivoting of the shift lever in the second mode.

Accordingly, the shifter assembly provides both mechanical and electronic actuation to the transmission with the arm and the cam of the shifter assembly being separated from each other and with the arm urging the cam to pivot to provide mechanical actuation, and with the arm also preventing the cam from unexpectedly moving out of position without the intent of the driver of the vehicle when the shifter assembly is in the second mode thereby decreasing the possibility that the transmission will be damaged.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION OF THE INVENTION

Referring to the Figures, wherein like numerals indicate like or corresponding parts throughout the several views, a shifter assembly 10 is generally shown in FIGS. 1-5. The shifter assembly 10 is utilized with a transmission of a vehicle. Specifically, the shifter assembly 10 provides mechanical actuation to the transmission of the vehicle by movement of a control cable 12. Additionally, the shifter assembly 10 provides electronic actuation to the transmission of the vehicle.

Figure 1:
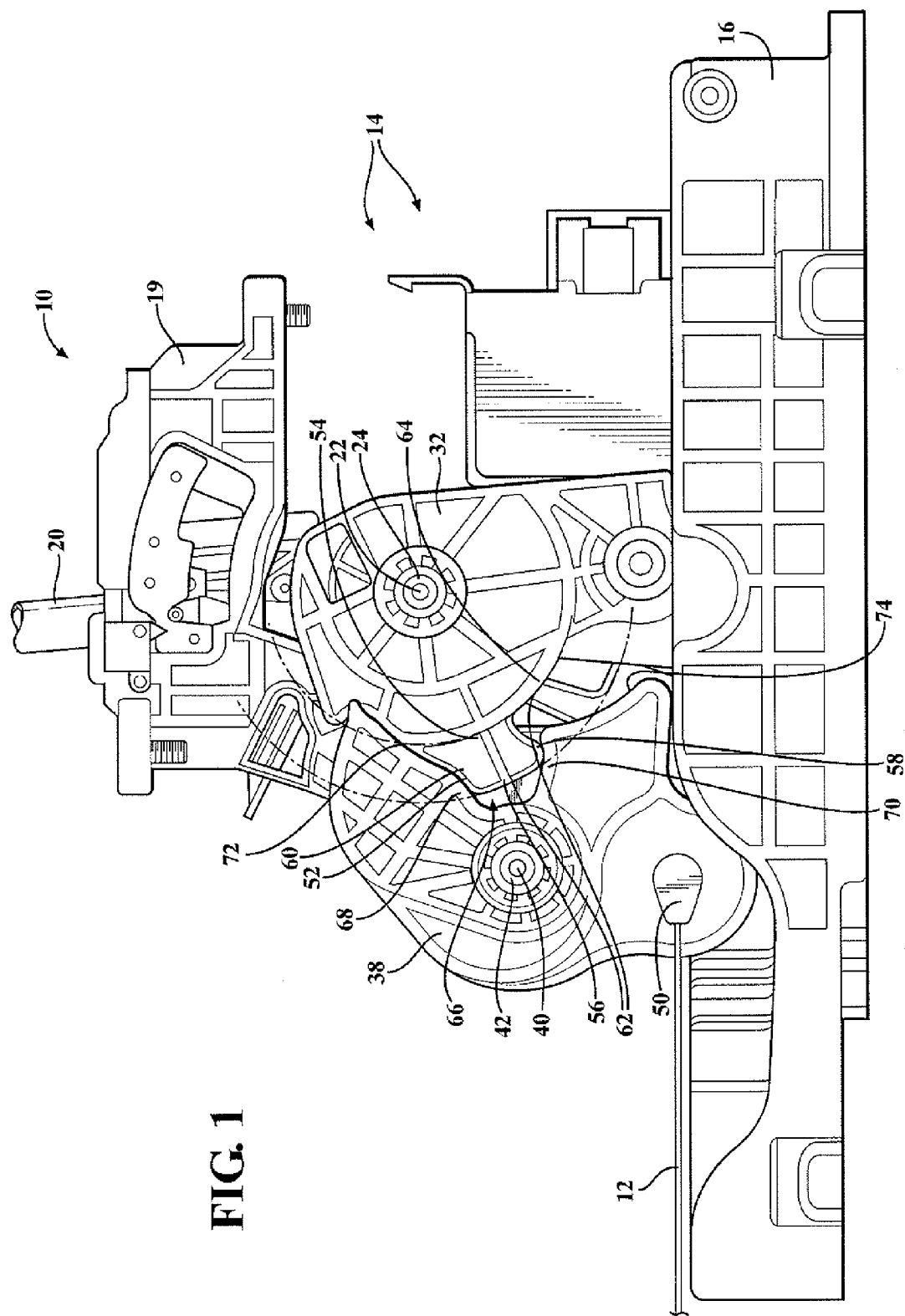
FIG. 1 is a side view of a shifter assembly including a shift lever in a park position and a cam in a first position.
Figure 2:
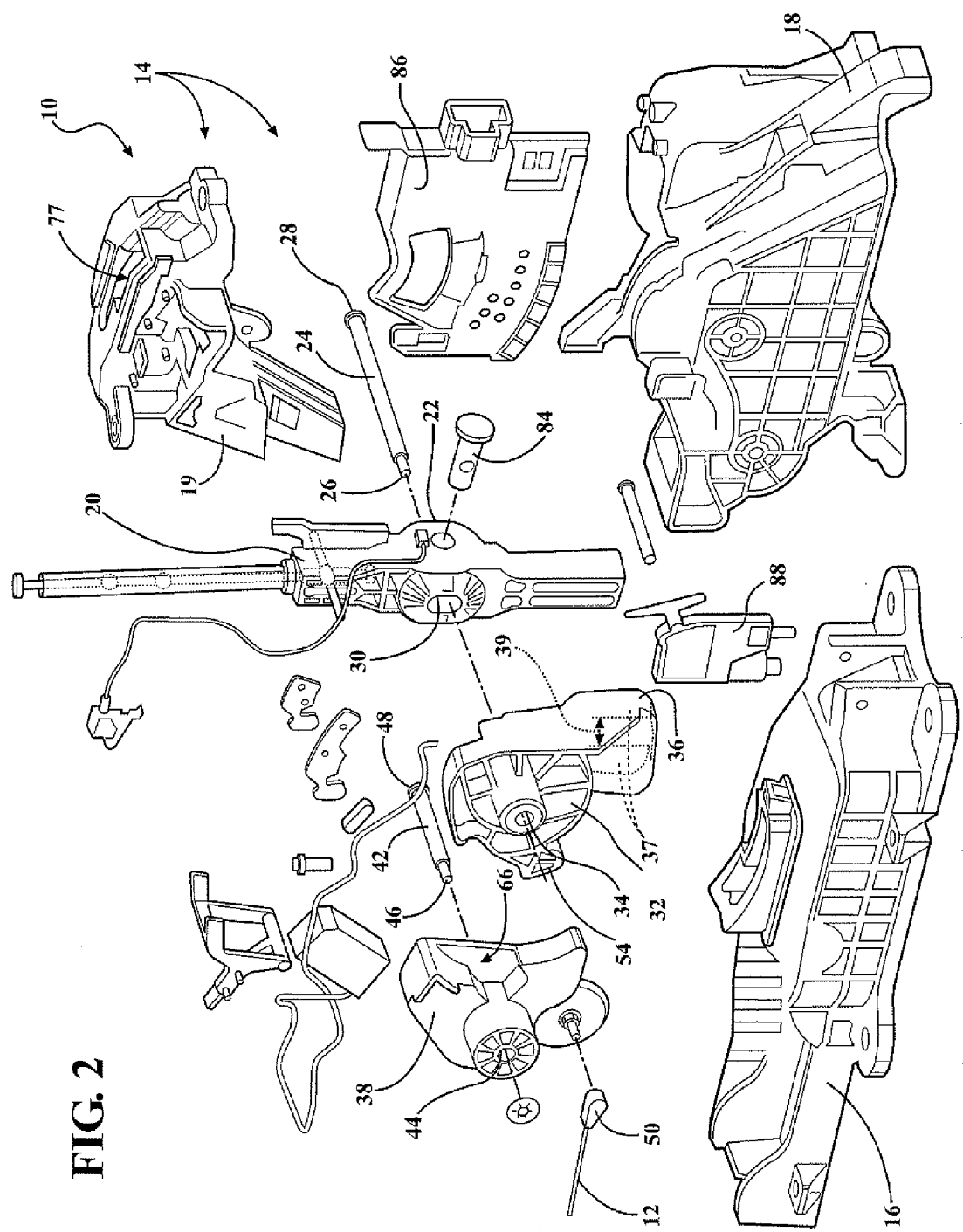
FIG. 2 is an exploded view of the shifter assembly.

The shifter assembly 10 includes a housing 14 which further includes a base 16. As shown in FIG. 2, the housing 14 further includes a casing 18 coupled to the base 16, and more specifically disposed above the base 16. For illustrative purposes, the casing 18 of the housing 14 has been removed in FIGS. 1 and 3-5. The housing 14 further includes a cover 19 being partially disposed above the casing 18 and coupled to the casing 18 and the base 16. It is to be appreciated that the housing 14 may be any configuration for accommodating components of the shifter assembly 10.

The shifter assembly 10 further includes a shift lever 20 coupled to the housing 14 and pivotable about a first axis 22 in a first mode for providing mechanical actuation to the transmission. Furthermore, the shift lever 20 is pivotable about the first axis 22 in a second mode for providing electronic actuation to the transmission. Specifically, mechanical actuation of the transmission by movement of the control cable 12 is provided as the shift lever 20 pivots in the first mode. The first mode and the second mode will be described in further detail below.

As mentioned above, the shift lever 20 is pivotable about the first axis 22. Specifically, the shift lever 20 pivots about a first shaft 24. The first shaft 24 includes a first distal end 26 and a second distal end 28 spaced opposite the first distal end 26. The first and second distal ends 26, 28 of the first shaft 24 are coupled to the casing 18 of the housing 14. The shift lever 20 further defines a hollow 30 for receiving the first shaft 24. As such, the shift lever 20 is pivotable about the first axis 22 and coupled to the housing 14 by the first shaft 24.

The shifter assembly 10 further includes an arm 32 coupled to the housing 14 and pivotable about the first axis 22 concurrently with the shift lever 20 in at least the first mode. The arm 32 and the shift lever 20 are both disposed and pivotable about the first axis 22. Specifically, the arm 32 defines an aperture 34 and the first shaft 24 is further disposed through the aperture 34 of the arm 32. As such, the arm 32 and the shift lever 20 are pivotable about the first shaft 24. The arm 32 is coupled to the housing 14 by being disposed about the first shaft 24.

The arm 32 and the shift lever 20 are concurrently pivotable about the first axis 22. Specifically, the arm 32 includes a catch 36 adjacent the base 16 of the housing 14. The catch 36 has a pair of flanges 37 extending from the arm 32 with the pair of flanges 37 defining a gap 39. The shift lever 20 is selectively disposed in the gap 39 thus engaging the catch 36. The shift lever 20 selectively engages the catch 36 such that the arm 32 is pivotable concurrently with the shift lever 20 in response to movement of the shift lever 20 in at least the first mode. It is to be appreciated that the shift lever 20 may selectively engage the arm 32 using any suitable method.

The shifter assembly 10 further includes a cam 38 coupled to the housing 14 and pivotable about a second axis 40 spaced from the first axis 22 between a first position and a second position for moving the control cable 12 to mechanically actuate the transmission. Specifically, the cam 38 is pivotable about a second shaft 42. In particular, the cam 38 is shown in the first position in FIG. 1 and in the second position in FIGS. 3-5. The cam 38 defines an opening 44 for receiving the second shaft 42. The second shaft 42 has a first lateral end 46 and a second lateral end 48 being spaced opposite the first lateral end 46. The first and second lateral ends 46, 48 of the second shaft 42 are coupled to the casing 18 of the housing 14. As such, the cam 38 is pivotable about the second axis 40 and coupled to the housing 14 by the second shaft 42.

The arm 32 is separated from the cam 38 such that the arm 32 rotates about the first axis 22 independently of the cam 38 as the shift lever 20 pivots in at least the second mode. As described above, the arm 32 is pivotable about the first axis 22 and the cam 38 is pivotable about the second axis 40. The second axis 40 is spaced apart from the first axis 22. Separation of the arm 32 and the cam 38 enables the arm 32 to directly urge the cam 38 to pivot to provide mechanical actuation, and enables the arm 32 to prevent the cam 38 from unexpectedly moving out of position without the intent of the driver of the vehicle when the shifter assembly 10 is in the second mode. Generally, the first axis 22 and the second axis 40 are disposed substantially parallel to one another. However, it is to be appreciated that the first axis 22 and the second axis 40 may be oriented and/or spaced in any other suitable manner.

As mentioned above, the cam 38 is pivotable between the first position and the second position for moving the control cable 12 to mechanically actuate the transmission. The control cable 12 has a first end 50 and a second end opposite the first end 50. The first end 50 of the control cable 12 is coupled to the shifter assembly 10. Specifically, the first end 50 of the control cable 12 is coupled to the cam 38. The second end of the control cable 12 is generally coupled to the transmission. For simplicity of illustration, the second end of the control cable 12 is not shown in the Figures. As the cam 38 pivots between the first position and the second position, the first end 50 of the control cable 12 will move in response to movement of the cam 38. In turn, the control cable 12 will create a pushing or pulling force to mechanically actuate the transmission. As such, the cam 38 is pivotable between the first position and the second position for moving the control cable 12 to mechanically actuate the transmission.

As best illustrated in FIGS. 1 and 3-5, the arm 32 includes a first engagement surface 52. Specifically, the arm 32 includes an extension 54 extending from the arm 32 transverse to the first axis 22. The extension 54 is generally disposed between the first axis 22 and the second axis 40 and extends from the arm 32 towards the cam 38.

The extension 54 includes a front face 56 having an arcuate configuration. The extension 54 further includes a bottom face 58 disposed adjacent the front face 56. The extension 54 further includes a top face 60 being disposed adjacent the front face 56. The top face 60 is disposed opposite the bottom face 58. As such, the front face 56 is disposed between the top face 60 and the bottom face 58. The top face 60 and the bottom face 58 generally have a contoured surface to allow smooth engagement between the arm 32 and the cam 38, as will be described below. However, it is to be appreciated that the top face 60 and the bottom face 58 may be any suitable surface to facilitate abutment between the arm 32 and the cam 38. Additionally, the front face 56 may be any suitable configuration, such as having a contoured configuration, or the like. The top face 60 and the bottom face 58 define the first engagement surface 52. As will be described in greater detail below, the first engagement surface 52 of the arm 32 urges the cam 38 to move between the first and second positions as the shift lever 20 pivots in the first mode. The front face 56, the bottom face 58, and the top face 60 collectively define a rectangular configuration for the extension 54. However, it is to be appreciated that the extension 54 may be any suitable configuration.

The arm 32 further includes a second engagement surface 62. Specifically, the arm 32 includes a first profile 64 disposed adjacent the extension 54. The first profile 64 is disposed adjacent the bottom face 58 of the extension 54. The first profile 64 generally faces the cam 38 and has an arcuate configuration.

The first profile 64 of the arm 32 and the front face 56 of the extension 54 define the second engagement surface 62. As will be described in greater detail below, the second engagement surface 62 of the arm 32 abuts the cam 38 as the shift lever 20 pivots in the second mode such that the arm 32 pivots about the first axis 22 while the cam 38 remains stationary.

The cam 38 further defines a groove 66 with the extension 54 of the arm 32 engaging the groove 66. The groove 66 is generally disposed between the first axis 22 and the second axis 40. The groove 66 is defined by a top edge 68 and a bottom edge 70 of the cam 38. As illustrated in FIG. 1, the shift lever 20 is in a park "P" position with the top edge 68 of the cam 38 abutting the top face 60 of the extension 54 and the bottom edge 70 of the cam 38 abutting the bottom face 58 of the extension 54. As such, the top edge 68 and the bottom edge 70 of the cam 38 are disposed adjacent one another.

The groove 66 is further defined by a front edge 72 of the cam 38. The front edge 72 of the cam 38 is disposed adjacent the top edge 68. As such, the top edge 68 is disposed between the front edge 72 and the bottom edge 70. The front edge 72 generally has an arcuate configuration and faces the arm 32. In the first mode, the extension 54 of the arm 32 is disposed in the groove 66 of the cam 38 with the top edge 68 of the cam 38 abutting the top face 60 of the extension 54, and the bottom edge 70 of the cam 38 abutting the bottom face 58 of the extension 54. In addition, the front edge 72 of the cam 38 abuts the arm 32 such that the cam 38 fits firmly against the arm 32 for securing the cam 38 to the arm 32 in the first mode.

Figure 3:
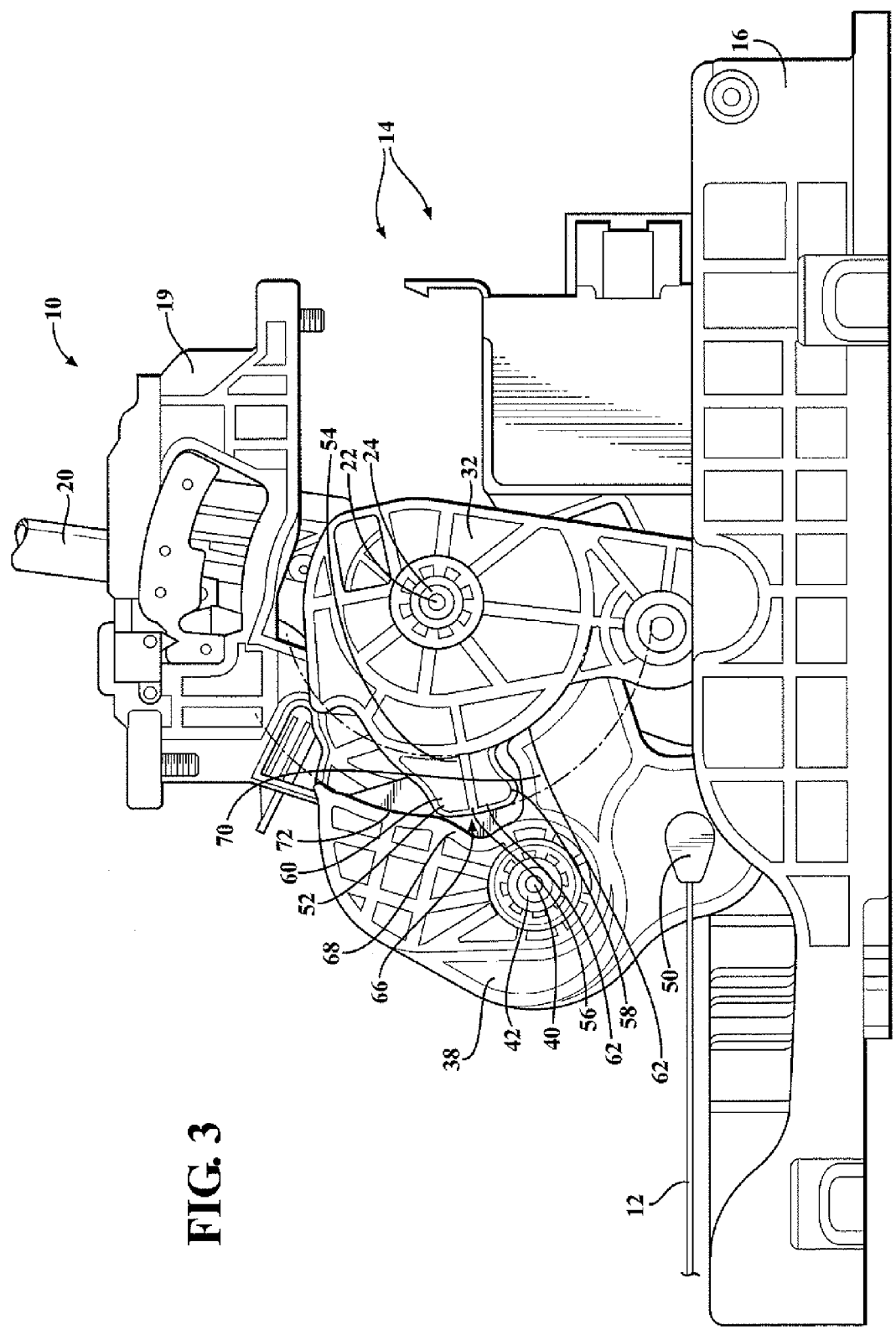
FIG. 3 is a side view of the shifter assembly with the shift lever in a reverse position and the cam in a second position.

The first engagement surface 52 of the arm 32 urges the cam 38 to move between the first and second positions as the shift lever 20 pivots in the first mode such that the arm 32 pivots about the first axis 22 concurrently with the cam 38 pivoting about the second axis 40 for moving the control cable 12 and providing mechanical actuation to the transmission. As illustrated in FIG. 3, the shift lever 20 is in a reverse "R" position with the first engagement surface 52 of the arm 32 interacting with the groove 66. In particular, the top face 60 of the extension 54 abuts the top edge 68 of the cam 38 to urge the cam 38 to move from the first position to the second position as the shift lever 20 pivots in a first direction in the first mode. The first direction of the shift lever 20 is broadly contemplated to include movement of the shift lever 20 in a linear direction from the front of the vehicle to the rear of the vehicle. For example, the shift lever 20 pivots in the first direction as the shift lever 20 moves from the park position to the reverse position. Similarly, the bottom face 58 of the extension 54 abuts the bottom edge 70 of the cam 38 urging the cam 38 to move from the second position to the first position as the shift lever 20 pivots in a second direction in the first mode. The second direction of the shift lever 20 is broadly contemplated to include movement of the shift lever 20 in a linear direction from the rear of the vehicle to the front of the vehicle. For instance, the shift lever 20 pivots in the second direction as the shift lever 20 moves from the reverse position to the park position. In either instance, engagement between the first engagement surface 52 of the arm 32 and the cam 38 occurs as the shift lever 20 pivots in the first mode. As the cam 38 pivots between the first position and the second position, the control cable 12 moves in response to the cam 38 which in turn provides mechanical actuation to the transmission. As mentioned above, the cam 38 is shown in the first position in FIG. 1 and in the second position in FIGS. 3-5. Accordingly, interaction between the shift lever 20, the arm 32, and the cam 38 demonstrates that the shifter assembly 10 provides mechanical actuation to the transmission by movement of the control cable 12 as the shift lever 20 pivots in the first mode. It is to be appreciated that no single position of the shift lever 20, e.g., park, reverse, etc., is restricted exclusively to either the first mode or second mode. In other words, a position of the shift lever 20 may be part of the first mode during which the shifter assembly 10 is providing mechanical actuation, as well as the second mode during which the shifter assembly 10 is providing electronic actuation.

As mentioned above, the arm 32 pivots about the first axis 22 concurrently while the cam 38 pivots about the second axis 40. In particular, the arm 32 rotates about the first axis 22 in a first direction and the cam 38 rotates about the second axis 40 in a second direction opposite the first direction as the first engagement surface 52 of the arm 32 urges the cam 38 to move between the first and second positions. For example, the first direction of the arm 32 may be clockwise and the second direction of the cam 38 may be counterclockwise relative to the orientation to the Figures. Alternatively, the first direction of the arm 32 may be counterclockwise and the second direction of the cam 38 may be clockwise. It is to further be appreciated that the first and second directions of the arm 32 and the cam 38, respectively, may both be clockwise or counterclockwise.

As mentioned above, the second engagement surface 62 of the arm 32 abuts the cam 38 as the shift lever 20 pivots in the second mode such that the arm 32 pivots about the first axis 22 while the cam 38 remains stationary. Specifically, the front face 56 of the extension 54 abuts the front edge 72 of the cam 38 as the shift lever 20 pivots in the second mode such that the arm 32 pivots about the first axis 22 while the cam 38 remains stationary. In particular, the front face 56 of the extension 54 abuts the front edge 72 of the cam 38 at a first point of contact. Additionally, the cam 38 includes a second profile 74 disposed adjacent the bottom edge 70 of the cam 38. The second profile 74 generally faces the arm 32 and has an arcuate configuration corresponding to the arcuate configuration of the first profile 64 of the arm 32. The first profile 64 of the arm 32 abuts the second profile 74 of the cam 38 as the shift lever 20 pivots in the second mode such that the arm 32 pivots about the first axis 22 while the cam 38 remains stationary. Specifically, the first profile 64 of the arm 32 abuts the second profile 74 of the cam 38 at a second point of contact. Thus, as the shift lever 20 pivots in the second mode, the cam 38 is prevented from effectively pivoting as a result of the arm 32 abutting the cam 38 at the first and second points of contact.

Figure 4:
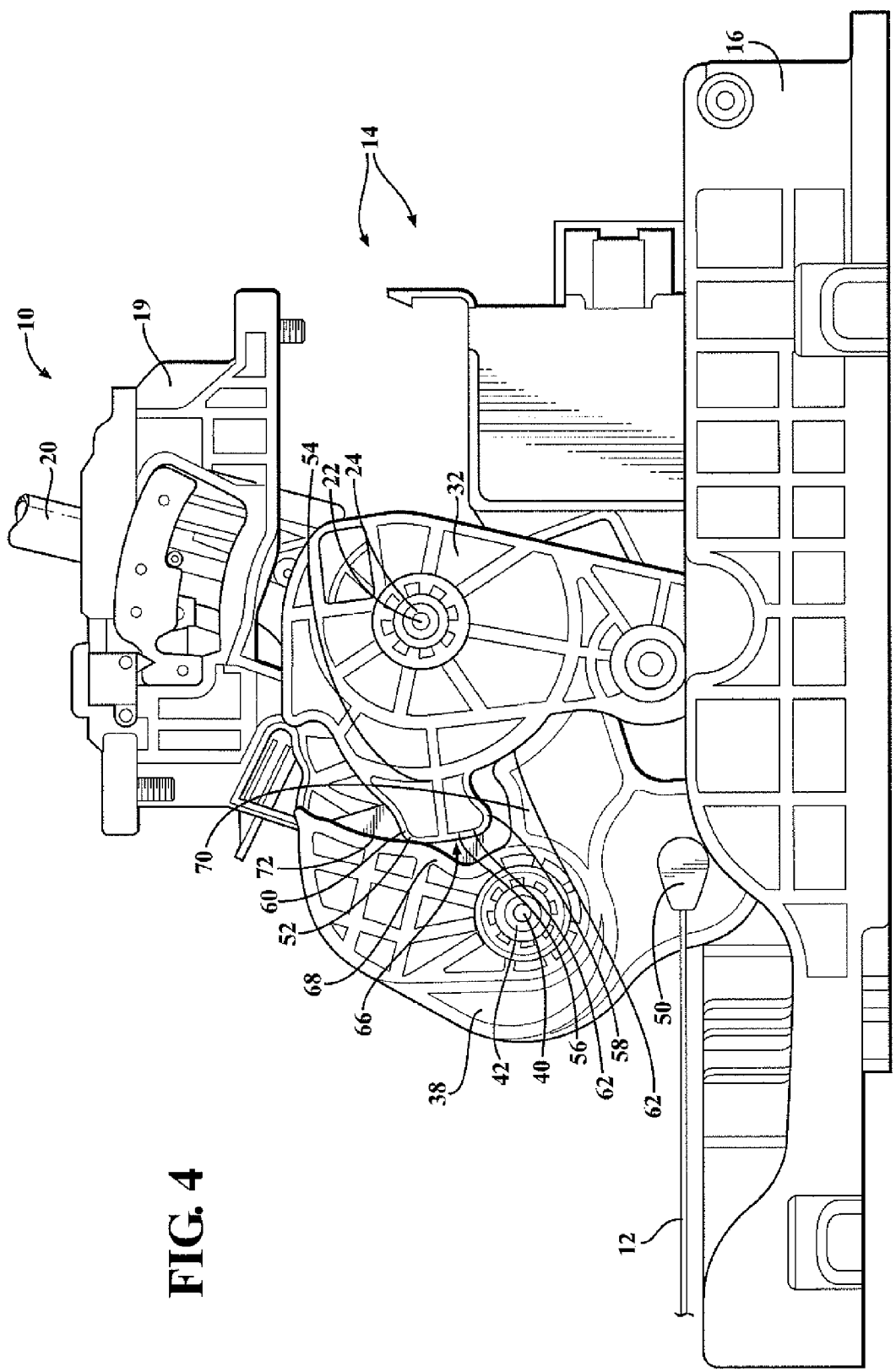
FIG. 4 is a side view of the shifter assembly with the shift lever in a neutral position.
Figure 5:
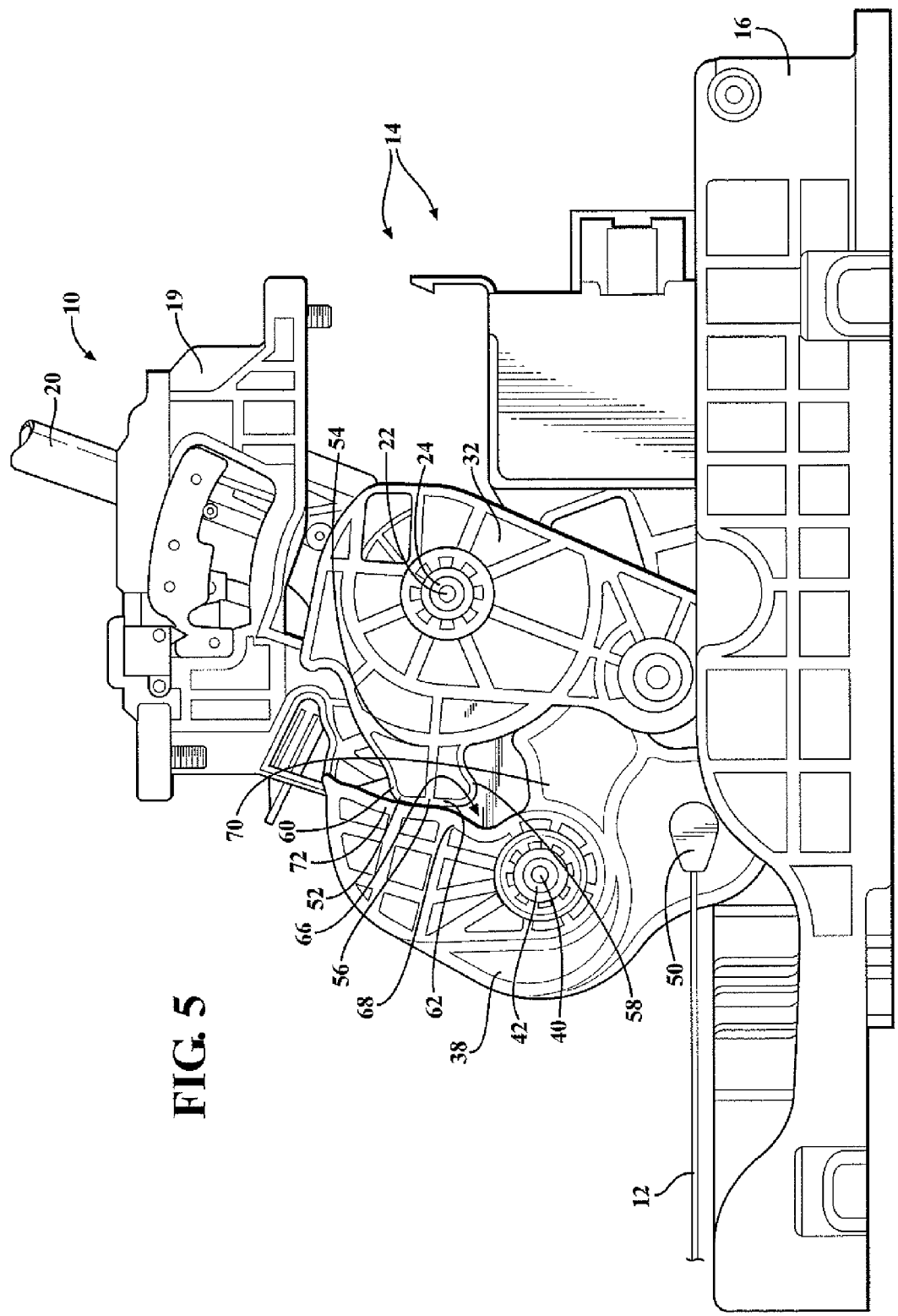
FIG. 5 is a side view of the shifter assembly with the shift lever in a drive position.

As described earlier, as the shift lever 20 pivots in the second mode, the arm 32 pivots about the first axis 22 while the cam 38 remains stationary. As shown in FIGS. 3-5, in the second mode, the second engagement surface 62 of the arm 32 abuts the cam 38 to prevent the cam 38 from pivoting. As such, the control cable 12 coupled to the cam 38 remains stationary because the cam 38 remains stationary. Therefore, the arm 32 prevents the cam 38 from inadvertently moving out of place. In turn, the control cable 12 is prevented from shifting and creating the pushing or pulling force to actuate the transmission without the knowledge of the driver of the vehicle.

The shifter assembly 10 is generally shown with the shift lever 20 in the second mode in FIGS. 3-5. Specifically, in FIG. 4 the shift lever 20 is in a neutral "N" position, and in FIG. 5 the shift lever 20 is in a drive "D" position. In FIGS. 3-5 the second engagement surface 62 of the arm 32 continuously abuts the second profile 74 and the front edge 72 of the cam 38, simultaneously, in the second mode. However, it is to be appreciated the cam 38 could move slightly relative to the arm 32 so long as the control cable 12 does not provide any meaningful actuation to the transmission. As such, the cam 38 is prevented from effectively pivoting when in the second mode so as to prevent any mechanical actuation to the transmission.

As illustrated in FIGS. 1 and 3, the front face 56 of the extension 54 has an arcuate configuration and defines a first radius of curvature having a center at the first axis 22. In addition, the front edge 72 of the cam 38 has an arcuate configuration corresponding to the arcuate configuration of the front face 56. The arcuate front edge 72 aligns with the first radius of curvature of the arcuate front face 56 when in the second mode. In other words, in the second mode, the cam 38 is in the second position and the front edge 72 of the cam 38 is positioned such that the front edge 72 aligns to the first radius of curvature. The arcuate front face 56 engages the arcuate front edge 72 to prevent movement of the cam 38 in a first direction. From the perspective as shown in FIGS. 1 and 3, the first direction of the cam 38 is a clockwise direction and the arcuate front face 56 prevents the cam 38 from pivoting in the clockwise direction in the second mode.

Similarly, the first profile 64 of the arm 32 has an arcuate configuration and defines a second radius of curvature having a center at the first axis 22. Additionally, the second profile 74 of the cam 38 has an arcuate configuration corresponding to the arcuate configuration of the first profile 64. The arcuate second profile 74 aligns with the second radius of curvature of the arcuate first profile 64 when in the second mode. In other words, in the second mode, the cam 38 is in the second position and the second profile 74 is positioned such that the arcuate second profile 74 aligns to the second radius of curvature. As such, the arcuate first profile 64 and the arcuate second profile 74 align with the second radius of curvature in the second mode. The arcuate first profile 64 engages the arcuate second profile 74 to prevent movement of the cam 38 in a second direction opposite the first direction. From the perspective as shown in FIGS. 1 and 3, the second direction of the cam 38 is a counterclockwise direction and the arcuate first profile 64 prevents the cam 38 from pivoting in the counterclockwise direction in the second mode.

In the most preferred embodiment, the arcuate front face 56 engages the arcuate front edge 72 to prevent movement of the cam 38 in the first direction while the arcuate first profile 64 engages the arcuate second profile 74 to prevent movement of the cam 38 in the second direction such that the cam 38 is prevented from effectively pivoting between the first and second positions for preventing movement of the control cable 12 while the arm 32 pivots about the first axis 22. In other words, in the second mode, the front face 56 of the extension 54 and the front edge 72 of the cam 38 align with the first radius of curvature, and the arcuate first profile 64 and arcuate second profile 74 align with the second radius of curvature. As such, the arm 32 prevents the cam 38 from effectively pivoting to provide mechanical actuation by preventing movement of the control cable 12 because the front face 56 of the extension 54 abuts the front edge 72 of the cam 38 simultaneously while the first profile 64 of the arm 32 abuts the second profile 74 of the cam 38. In turn, the arm 32 prevents the cam 38 from effectively pivoting to provide mechanical actuation while simultaneously pivoting about the first axis 22 in the second mode without interfering with the cam 38. Specifically, the second engagement surface 62 of the arm 32 is able clear the groove 66 of the cam 38 such that the arm 32 pivots about the first axis 22 while the cam 38 remains stationary.

Again, it is to be appreciated that although the second engagement surface 62, i.e., the front face 56 of the extension 54 and the first profile 64 of the arm 32, clears the cam 38 as the shift lever 20 pivots in the second mode, the second engagement surface 62 will still abut the cam 38 so as to prevent the cam 38 from pivoting about the second axis 40 as the shift lever 20 pivots in the second mode. Furthermore, it is to be appreciated that the second engagement surface 62 of the arm 32 may clear the groove 66 of the cam 38 according to any suitable configuration. For instance, the front face 56 and the front edge 72, as well as the first profile 64 and the second profile 74, respectively, may align along any suitable curvature or path.

Figure 6:
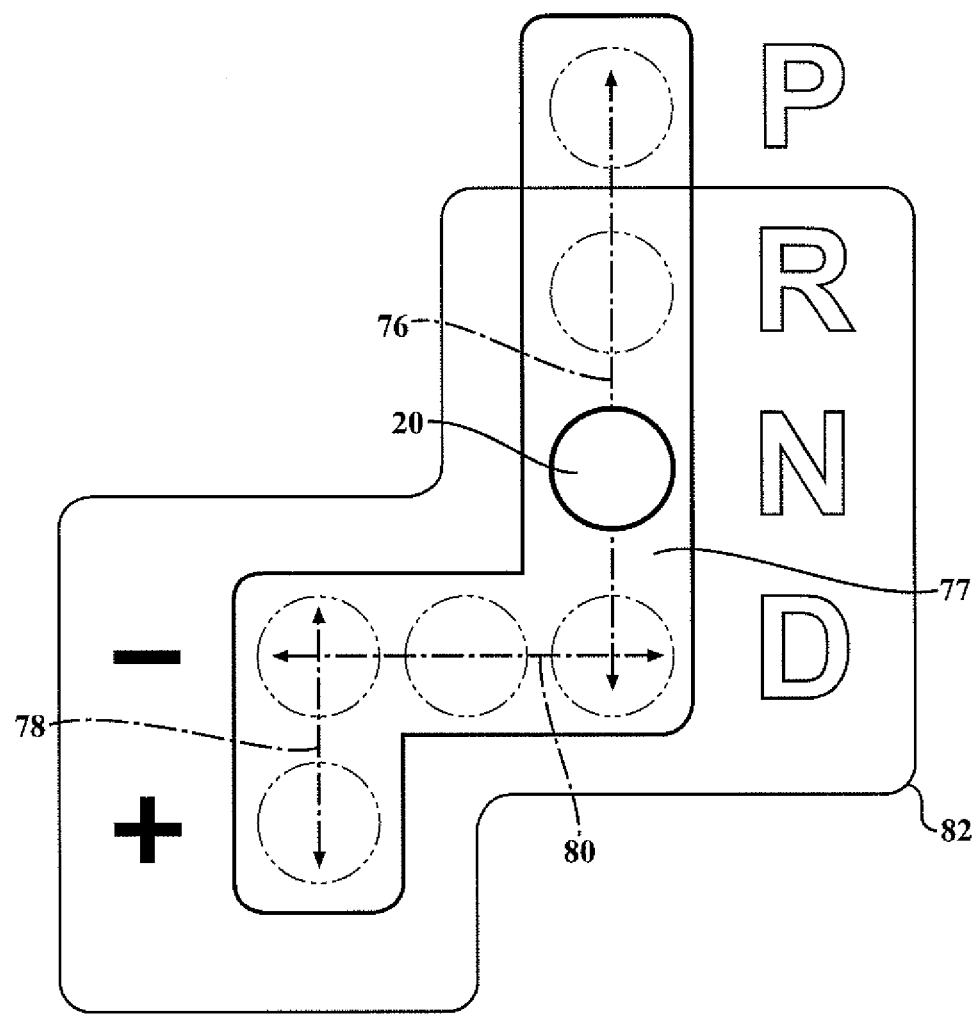
FIG. 6 is a plan view of a first shift path, a second shift path, and a third shift path which accommodate movement of the shift lever.

As shown in FIG. 6, the shifter assembly 10 further includes a first shift path 76. Generally, the cover 19 of the housing defines a gate 77 with the shift lever 20 disposed through the gate 77. The shift lever 20 is moveable along the first shift path 76 such that first shift path 76 generally accommodates movement of the shift lever 20. The first shift path 76 includes at least the park position "P", the reverse position "R", the neutral position "N", and the drive position "D." It is to be appreciated that the first shift path 76 may include other positions, such as, a first low position "L1", a second low position "L2", an overdrive position "OD", and the like. As the shift lever 20 pivots in the first mode, mechanical actuation of the transmission occurs in the first shift path 76. Specifically, the shift lever 20 is pivotable in the first mode between the park position and at least one other position. For instance, the shifter assembly 10 may provide mechanical actuation to the transmission as the shift lever 20 pivots between the park position and the reverse position. In addition, the shifter assembly 10 may, for example, provide mechanical actuation to the transmission when the shift lever 20 pivots between more than two positions. For example, mechanical actuation may be provided as the shift lever 20 pivots between the park position and the reverse position, as well as between the reverse position and the neutral position.

The shifter assembly 10 is particularly advantageous in embodiments whereby the shifter assembly 10 exclusively provides electronic actuation to the transmission except as the shift lever 20 pivots in/out of the park position to provide mechanical actuation. Mainly, in the event of power loss to the vehicle, electronic actuation of the transmission is unavailable. However, because the shifter assembly 10 may provide mechanical actuation to the transmission independent of electronic actuation, the shifter assembly 10 is still capable of providing mechanical actuation to the transmission during power loss. Specifically, if the transmission of the vehicle is in the park position and the vehicle must be towed during a power loss, the transmission can be mechanically actuated to allow release of the vehicle from the park position such that the vehicle may become mobile. Additionally, it is particularly important that the shifter assembly 10 reliably actuate the transmission in/out of the park position. Although electronic actuation enables the shifter assembly 10 to be built using less components, mechanical actuation tends to be more reliable than electronic actuation to the transmission. It is to be appreciated that the shifter assembly 10 will likely be in the park position a majority of the time. However, the vehicle is most often left unattended in the park position. Therefore, if an unattended vehicle were to lose power while the shifter assembly 10 is in the park position, there is a possibility that the unattended vehicle may roll without a driver present. Similarly, if the vehicle were to lose power while the shifter assembly 10 is in a position other than park, such as a neutral position, the shifter assembly 10 would not be able to actuate the transmission of the vehicle into park. As such, by providing mechanical actuation in/out of the park position, with all other positions being electronically actuated, the shifter assembly 10 can be built with less components, yet still provide the reliability required in critical circumstances, such as actuating the transmission in/out of the park position.

Additionally, as the shift lever 20 pivots in the second mode, electronic actuation of the transmission occurs in the first shift path 76. Specifically, the shift lever 20 is pivotable in the second mode between the reverse position and at least one other position. For instance, the shifter assembly 10 may provide electronic actuation to the transmission as the shift lever 20 pivots between the reverse position and the neutral position. In addition, the shifter assembly 10 may, for example, provide electronic actuation to the transmission as the shift lever 20 is pivoted between more than two positions. For example, electronic actuation may be provided as the shift lever 20 pivots from the reverse position to the neutral position, as well as between the neutral position to the drive position.

The shifter assembly 10 further includes a second shift path 78 being generally parallel to the first shift path 76. The shift lever 20 is movable between the first shift path 76 and the second shift path 78 across a third shift path 80 being transverse to the first and second shift paths 76, 78. The third shift path 80 connects the first and second shift paths 76, 78. Specifically, the shift lever 20 is moveable from the first shift path 76 through the third shift path 80 from the drive position. However, it is to be appreciated that the shift lever 20 may be moveable from the first shift path 76 through the third shift path 80 from any suitable position. It is also to be appreciated that as the shift lever 20 pivots in the first mode, mechanical actuation of the transmission may occur in the first, second and/or the third shift paths 76, 78, 80. In addition, as the shift lever 20 pivots in the second mode, electronic actuation of the transmission may occur in the first, second and/or the third shift paths 76, 78, 80. In FIG. 6, a region 82 defines where the shift lever 20 is in the second mode with respect to the first, second, and third shift paths 76, 78, 80. The region 82 is an imaginary reference area merely provided to illustrate the second mode and is not intended to limit the second mode to the region 82.

The shift lever 20 and the arm 32 are disengaged and the shift lever 20 moves independently of the arm 32 as the shift lever 20 moves in the second and third shift paths 78, 80. Specifically, as illustrated in FIG. 5, the shift lever 20 is pivotable about a pivot pin 84 for allowing the shift lever 20 to pivot across the third shift path 80. The pivot pin 84 is disposed transverse to the first axis 22 to allow the shift lever 20 to pivot transversely with respect to the first shift path 76 and towards the second shift path 78. As the shift lever 20 pivots about the pivot pin 84 across the third shift path 80, the shift lever 20 disengages the catch 36. In turn, the arm 32 and the shift lever 20 no longer concurrently pivot about the first axis 22. As a result, the shift lever 20 moves independently of the arm 32. However, it is to be appreciated that the shift lever 20 and the arm 32 may remain engaged throughout operation of the shifter assembly 10 in the first and/or second modes. Furthermore, the shift lever 20 and the arm 32 may remain engaged throughout operation of the shifter assembly 10 in the first, second, and/or third shift paths 76, 78, 80.

The second shift path 78 includes a manumatic mode with the shifter assembly 10 electronically actuating the transmission as the shift lever 20 pivots in the manumatic mode. The manumatic mode generally has an up-shift "+" position and a down-shift "−" position. The manumatic mode allows the transmission to be shifted up or down one gear lever by moving the shift lever 20 incrementally towards the up-shift position or the down-shift position, respectively.

As mentioned above, the transmission is electronically actuated as the shift lever 20 pivots in the second mode. A relative position of the shift lever 20 is sensed by a PCB subassembly 86 coupled to the housing 14. In particular, a magnet 88 is coupled to the shift lever 20 and moves in relation to movement of the shift lever 20 about the first axis 22. The PCB subassembly 86 electromagnetically senses movement of the magnet 88 as the shift lever 20 pivots. The PCB subassembly 86 generates an electronic signal corresponding to the relative position of the shift lever 20 and sends the electronic signal to a control unit. The control unit receives and processes the electronic signal to command the transmission to actuate into a gear position corresponding to the relative position of the shifter lever 20 sensed by the PCB subassembly 86.

The present invention further provides a method of operating the shifter assembly 10. As described above, the shifter assembly 10 has the shift lever 20 and the arm 32 disposed about the first axis 22. The arm 32 has the first engagement surface 52 and the second engagement surface 62. The cam 38 is disposed about the second axis 40 spaced from the first axis 22.

The method includes the step of concurrently pivoting the shift lever 20 and the arm 32 about the first axis 22 in the first mode to provide mechanical actuation to the transmission. Specifically, the shift lever 20 and the arm 32 are engaged. That is, the shift lever 20 selectively engages the catch 36 of the arm 32 by entering the gap 39 defined by the catch 36. Once the shift lever 20 has engaged the catch 36, the shift lever 20 and the arm 32 pivot concurrently about the first axis 22 in the first mode to provide mechanical actuation to the transmission. In particular, engagement between the catch 36 of the arm 32 and the shift lever 20 forces the arm 32 to pivot concurrently with the shift lever 20 in response to movement of the shift lever 20 in the first mode.

The method further includes the step of engaging the first engagement surface 52 of the arm 32 with the cam 38 to simultaneously rotate the cam 38 about the second axis 40 concurrently with the arm 32 pivoting in the first mode. Specifically, the arm 32 rotates about the first axis 22 in the first direction and the cam 38 rotates about the second axis 40 in the second direction opposite the first direction as the first engagement surface 52 of the arm 32 engages the cam 38. As the cam 38 rotates about the second axis 40, the cam 38 will move between the first position and the second position. The control cable 12 coupled to the cam 38 will shift in response to movement of the cam 38 between the first and second positions. In turn, the control cable 12 will create the pushing or pulling force to mechanically actuate the transmission.

The method further includes the step of pivoting the shift lever 20 about the first axis 22 in the second mode to provide electronic actuation to the transmission. In one instance, the shift lever 20 and the arm 32 are disengaged and the shift lever 20 moves independently of the arm 32 as the shift lever 20 pivots in the second mode. As such, only the shift lever 20 is pivoted about the first axis 22 in the second mode while the arm 32 remains stationary. Alternatively, both the shift lever 20 and the arm 32 pivot concurrently about the first axis 22 in the second mode. The arm 32 is separated from the cam 38 such that the arm 32 rotates about the first axis 22 independently of the cam 38 as the shift lever 20 pivots in at least the second mode.

The method further includes the step of abutting the second engagement surface 62 of the arm 32 against the cam 38 to prevent movement of the cam 38 during pivoting of the shift lever 20 in the second mode. Specifically, the shift lever 20 pivots while the arm 32 and the cam 38 remain stationary with the arm 32 abutting the cam 38 to prevent movement of the cam 38. Alternatively, both the arm 32 and the shift lever 20 may concurrently pivot about the first axis 22 in the second mode while the cam 38 remains stationary. If the arm 32 pivots about the first axis 22 in the second mode, the second engagement surface 62 of the arm 32 is able clear the cam 38 such that the arm 32 pivots about the first axis 22 while the cam 38 remains stationary.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A shifter assembly for providing mechanical actuation to a transmission of a vehicle by movement of a control cable and for providing electronic actuation to the transmission of the vehicle, said shifter assembly comprising:
   a housing;
   a shift lever coupled to said housing and pivotable about a first axis in a first mode for providing mechanical actuation to the transmission, and a second mode for providing electronic actuation to the transmission;
   an arm coupled to said housing and pivotable about said first axis concurrently with said shift lever in at least said first mode and said arm including a first engagement surface and a second engagement surface; and
   a cam coupled to said housing and pivotable about a second axis spaced from said first axis between a first position and a second position for moving the control cable to mechanically actuate the transmission;
   wherein said first engagement surface of said arm urges said cam to move between said first and second positions as said shift lever pivots in said first mode such that said arm pivots about said first axis concurrently with said cam pivoting about said second axis for moving the control cable and providing mechanical actuation to the transmission and said second engagement surface of said arm abuts said cam as said shift lever pivots in said second mode such that said arm pivots about said first axis while said cam remains stationary.

2. The shifter assembly of claim 1 wherein said arm includes an extension with said extension including a top face, a bottom face, and a front face disposed between said top face and said bottom face with said top face and said bottom face further defining said first engagement surface, and a first profile disposed adjacent said extension with said first profile of said arm and said front face of said extension further defining said second engagement surface.

3. The shifter assembly of claim 2 wherein said cam further defines a groove with said extension of said arm adapted to engage said groove.

4. The shifter assembly of claim 3 wherein said groove is further defined by a top edge, a bottom edge, and a front edge of said cam.

5. The shifter assembly of claim 4 wherein said top face of said extension abuts said top edge of said cam urging said cam to move from said first position to said second position as said shift lever pivots in a first direction in said first mode, and said bottom face of said extension abuts said bottom edge of said cam urging said cam to move from said second position to said first position as said shift lever pivots in a second direction in said first mode.

6. The shifter assembly of claim 4 wherein said cam includes a second profile disposed adjacent said bottom edge of said cam and said first profile of said arm abuts said second profile of said cam and said front face of said extension abuts said front edge of said cam as said shift lever pivots in said second mode such that said arm pivots about said first axis while said cam remains stationary.

7. The shifter assembly of claim 4 wherein said front face of said extension has an arcuate configuration and defines a first radius of curvature having a center at said first axis and said front edge of said cam has an arcuate configuration corresponding to said arcuate configuration of said front face with said arcuate front edge aligning with said first radius of curvature of said arcuate front face when in said second mode, and said arcuate front face engaging said arcuate front edge to prevent movement of said cam in a first direction.

8. The shifter assembly of claim 6 wherein said first profile of said arm has an arcuate configuration and defines a second radius of curvature having a center at said first axis and said second profile of said cam has an arcuate configuration corresponding to said arcuate configuration of said first profile with said arcuate second profile aligning with said second radius of curvature of said arcuate first profile when in said second mode, and said arcuate first profile engaging said arcuate second profile to prevent movement of said cam in a second direction.

9. The shifter assembly of claim 6 wherein said front face of said extension has an arcuate configuration and defines a first radius of curvature having a center at said first axis and said front edge of said cam has an arcuate configuration corresponding to said arcuate configuration of said front face with said arcuate front edge aligning with said first radius of curvature of said arcuate front face when in said second mode, and said arcuate front face engaging said arcuate front edge to prevent movement of said cam in a first direction, and said first profile of said arm has an arcuate configuration and defines a second radius of curvature having a center at said first axis and said second profile of said cam has an arcuate configuration corresponding to said arcuate configuration of said first profile with said arcuate second profile aligning with said second radius of curvature of said arcuate first profile when in said second mode, and said arcuate first profile engaging said arcuate second profile to prevent movement of said cam in a second direction opposite said first direction, and said arcuate front face engaging said arcuate front edge to prevent movement of said cam in said first direction simultaneously while said arcuate first profile engages said arcuate second profile to prevent movement of said cam in said second direction such that said cam is prevented from effectively pivoting between said first and second positions for preventing movement of the control cable while said arm pivots about said first axis.

10. The shifter assembly of claim 1 further including a first shift path and a second shift path being generally parallel to said first shift path and said shift lever being moveable between said first shift path and said second shift path across a third shift path being transverse to said first shift path and said second shift path with said second shift path including a manumatic mode with said shifter assembly electronically actuating the transmission as said shift lever pivots in said manumatic mode.

11. The shifter assembly of claim 10 wherein said shift lever and said arm are disengaged and said shift lever moves independently of said arm as said shift lever pivots in said second and third shift paths.

12. The shifter assembly of claim 10 wherein said first shift path includes at least a park position, a reverse position, a neutral position, and a drive position with said shift lever being movable from said first shift path through said third path from said drive position.

13. The shifter assembly of claim 12 wherein said shift lever is pivotable in said first mode between said park position and at least one other position, and said shift lever is pivotable in said second mode between said reverse position and at least one other position.

14. The shifter assembly of claim 1 wherein said arm includes a catch and said shift lever selectively engages said catch such that said arm is pivotable concurrently with said shift lever in response to movement of said shift lever in at least said first mode.

15. The shifter assembly of claim 1 wherein said arm is separated from said cam such that said arm rotates about said first axis independently of said cam as said shift lever pivots in at least said second mode.

16. The shifter assembly of claim 1 wherein said arm rotates about said first axis in a first direction and said cam rotates about said second axis in a second direction opposite said first direction as said first engagement surface of said arm urges said cam to move between said first and second positions.

17. A method of operating a shifter assembly having a shift lever and an arm disposed about a first axis with the arm having a first engagement surface and a second engagement surface, and a cam disposed about a second axis spaced from the first axis, said method comprising the steps of:
concurrently pivoting the shift lever and the arm about the first axis in a first mode to provide mechanical actuation to a transmission;
engaging the first engagement surface of the arm with the cam to simultaneously rotate the cam about the second axis concurrently with the arm pivoting in the first mode;
pivoting the shift lever about the first axis in a second mode to provide electronic actuation to the transmission; and
abutting the second engagement surface of the arm against the cam to prevent movement of the cam during pivoting of the shift lever in the second mode.

18. A method as set forth in claim 17 wherein the arm rotates about the first axis in a first direction and the cam rotates about the second axis in a second direction opposite the first direction as the first engagement surface of the arm engages the cam.

19. A method as set forth in claim 17 wherein the shift lever and the arm pivot concurrently about the first axis in the second mode.

20. A method as set forth in claim 17 wherein the arm is separated from the cam such that the arm rotates about the first axis independently of the cam as the shift lever pivots in at least the second mode.

21. A method as set forth in claim 17 wherein the shift lever and the arm are disengaged and the shift lever moves independently of the arm as the shift lever pivots in the second mode.

22. The shifter assembly of claim 1 wherein said arm defines a first radius of curvature having a center at said first axis and with said cam aligning with said first radius of curvature when in said second mode to prevent movement of said cam in a first direction.

23. The shifter assembly of claim 1 wherein said arm defines a second radius of curvature having a center at said first axis and with said cam aligning with said second radius of curvature when in said second mode to prevent movement of said cam in a second direction.

24. The shifter assembly of claim 1 wherein said arm defines a first radius of curvature having a center at said first axis and with said cam aligning with said first radius of curvature when in said second mode to prevent movement of said cam in a first direction, and said arm defines a second radius of curvature having a center at said first axis and with said cam aligning with said second radius of curvature when in said second mode to prevent movement of said cam in a second direction opposite said first direction.

25. The shifter assembly of claim 1 wherein said arm engages said cam to prevent movement of said cam in a first direction simultaneously while engaging said cam to prevent movement of said cam in a second direction opposite said first direction such that said cam is prevented from effectively pivoting between said first and second positions for preventing movement of the control cable while said arm pivots about said first axis.

26. A method as set forth in claim 17 wherein the arm defines a first radius of curvature having a center at the first axis and further including the step of aligning the cam with the first radius of curvature when in the second mode to prevent movement of the cam in a first direction.

27. A method as set forth in claim 17 wherein the arm defines a second radius of curvature having a center at the first axis and further including the step of aligning the cam with the second radius of curvature when in the second mode to prevent movement of the cam in a second direction.

28. A method as set forth in claim 17 further including the step of engaging the arm with the cam to prevent movement of the cam in a first direction simultaneously while engaging the arm with the cam to prevent movement of the cam in a second direction opposite the first direction such that the cam is prevented from effectively pivoting between the first and second positions for preventing movement of the control cable while the arm pivots about the first axis.

* * * * *